United States Patent [19]

Gosiewski et al.

[11] Patent Number: 5,206,288

[45] Date of Patent: * Apr. 27, 1993

[54] ADHESIVE FOR LOW TEMPERATURE APPLICATIONS

[75] Inventors: Donald E. Gosiewski, Peabody; Paul C. Briggs, Charlestown, both of Mass.

[73] Assignee: Illinois Tool Works, Inc., Chicago, Ill.

[*] Notice: The portion of the term of this patent subsequent to Jul. 17, 2007 has been disclaimed.

[21] Appl. No.: 547,969

[22] Filed: Jul. 5, 1990

Related U.S. Application Data

[63] Continuation-in-part of Ser. No. 238,302, Aug. 29, 1988, Pat. No. 4,942,201.

[51] Int. Cl.$^5$ ............................................. C08L 9/06
[52] U.S. Cl. ....................................... 525/83; 525/71; 525/76
[58] Field of Search ..................... 525/83, 71, 76, 85

[56] References Cited

U.S. PATENT DOCUMENTS

| | | | |
|---|---|---|---|
| 4,536,546 | 8/1985 | Briggs | 525/83 |
| 4,596,857 | 6/1986 | Doi et al. | 525/255 |
| 4,942,201 | 7/1990 | Briggs et al. | 525/71 |

FOREIGN PATENT DOCUMENTS 0087304  8/1983  European Pat. Off.

*Primary Examiner*—Melvyn I. Marquis
*Assistant Examiner*—D. E. Aylward
*Attorney, Agent, or Firm*—Herbert P. Price

[57] ABSTRACT

Adhesive compositions are made from methacrylate ester monomers, elastomeric polymers having a Tg below $-25°$ C. and which are soluble in the monomers, core-shell polymers which swell in the monomers but do not dissolve therein, and free radical producing catalysts. These adhesive compositions when used in bonded assemblies exhibit a combination of high adhesive bond impact strength and high bulk tensile elongation.

7 Claims, No Drawings

ADHESIVE FOR LOW TEMPERATURE APPLICATIONS

CROSS REFERENCE

This is a continuation-in-part of Ser. No. 07/238,302, filed Aug. 29, 1988, now U.S. Pat. No. 4,942,201.

BACKGROUND OF THE INVENTION

The field of art to which this invention pertains is structural acrylic adhesives.

Structural acrylic adhesives are rubber-toughened adhesive systems that cure rapidly at room temperature to give excellent adhesive properties. Such adhesives are characterized by high peel strength, shear strength and chemical resistance. They are also tolerant of a variety of substrate surface contaminants, such as oil.

Fast curing adhesives are described in U.S. Pat. No. 3,832,274. These adhesives are made from elastomers having Tg's of less than 15° F., acrylic monomers and a redox catalyst.

Structural adhesives which contain chlorosulfonated polyethylee or sulfonyl chloride and chlorinated polymers are disclosed in such patents as U.S. Pat. Nos. 3,890,407, 3,962,372 and 4,287,106.

U.S. Pat. Nos. 4,126,504, 4,348,503 and 4,451,615 disclose various combinations of elastomers, acrylic monomers, catalysts and other additives.

Adhesives based on diene polymers, such as polybutadienes, polyisoprenes, butadiene-styrene copolymers and ABS graft polymers, plus vinyl monomers, adhesion promoters and the like are described in U.S. Pat. No. 4,287,106.

Methacrylate based adhesives which contain chlorinated or chlorosulfonated polyethylene polymers and graft copolymers of the core-shell type are disclosed in U.S. Pat. No. 4,536,546.

With the use of more and more plastics in structures, e.g., automobiles, there is a continuing and even increasing need for adhesives which can be used on plastics as well as metals to form bonds which will hold up under a wide variety of adverse conditions.

There is a particular need for structural adhesives which not only have high adhesive bond impact strength but also have high bulk tensile elongation when measured at low temperatures.

SUMMARY OF INVENTION

This invention is directed to structural adhesive compositions. In one aspect, this invention pertains to structural adhesives which have high adhesive bond impact strength. In another aspect, this invention relates to structural adhesives which have high bulk tensile elongation when measured at temperatures of −10° F. (−23° C.) or lower. In still another aspect, this invention relates to structural adhesives, the bulk tensile elongations of which are largely reversible even at low temperatures.

The adhesive compositions of this invention are comprised of:

A) a methacrylate ester monomer;
B) an elastomeric polymer soluble in the ester monomer, said polymer having a Tg below about −25° C.;
C) a core-shell graft copolymer which swells in the monomer but does not dissolve therein; and
D) a free radical producing catalyst.

The adhesive compositions of this invention, when used in bonded assemblies, exhibit a combination of high adhesive bond impact strength (at least 15 ft-lb/sq.in.) and high bulk tensile elongation (greater than 10 percent) when measured at −10° F. (−23° C.) or below.

DESCRIPTION OF THE INVENTION

The monomers useful in this invention are methacrylate ester monomers wherein the alcohol portion of the ester group contains one to eight carbon atoms. Examples of such ester monomers are methyl methacrylate, ethyl methacrylate, 2-ethyhexyl methacrylate, cyclohexyl methacrylate and mixtures thereof. The preferred ester monomer is methyl methacrylate.

Additional monomers which can be used in combination with the methacrylate monomers are acrylate esters wherein the alcohol portion of the ester contains 1 to 8 carbon atoms, examples of which are methyl acrylate, ethyl acrylate, butyl acrylate and 2-ethyhexyl acrylate. Other useful monomers are acrylonitrile, methacrylonitrile, styrene, vinyl toluene, and the like.

The useful monomer composition contains at least about 50 weight percent methacrylate monomer and, preferably, at least about 50 weight percent methyl methacrylate monomer.

Additional monomers which are used in combination with the methacrylate ester monomers are free radical polymerizable ethylenically unsaturated mono or polycarboxylic acids. Acrylic acid, methacrylic acid, crotonic acid, maleic acid and fumaric acid are examples of such acids. The preferred acid is methacrylic acid.

The elastomers useful in this invention have a second order glass transition temperature (Tg) of less than −25° and are soluble in the monomers described hereinabove. Useful elastomers are synthetic high polymers which exhibit plastic flow. The preferred elastomers are those which are supplied commercially as adhesive or cement grades.

A preferred class of elastomers for use in this invention are polychloroprene and copolymers of butadiene or isoprene with styrene, acrylonitrile, acrylate esters, methacrylate esters, and the like. Additional useful elastomers are copolymers of ethylene and acrylate esters, homopolymers of epichlorohydrin and copolymers of epichlorohydrin and ethylene oxide.

Specific examples of useful polymers using their letter designation according to ASTM D1418, their trade or common name and chemical description are: CR-Neoprene-polychloroprene; NBR-Nitrile rubber-butadiene acrylonitrile copolymer containing about 25 to about 45 weight percent acrylonitrile; COX—Hycar 1072-butadiene-acrylonitrile copolymer modified with carboxylic groups; SBR-GR-S-styrene-butadiene copolymer containing about 10 to about 30 weight percent styrene; ABR—Acrylic rubber acrylate butadiene copolymer; and CO, ECO-Hydrin 100 and 200-homopolymer or a copolymer of epichlorohydrin and ethylene oxide. Additional useful elastomers are copolymers of ethylene and acrylate esters, such as methyl acrylate and ethyl acrylate, wherein the copolymer contains at least 30 weight percent acrylate ester which elastomers are sold commercially by duPont under the Vamac trademark.

Elastomers useful in this invention are described in detail in the "Handbook of Plastics and Elastomers" pages 1-106-119, (1975) McGraw-Hill, Inc., which is hereby incorporated by reference.

Particularly useful elastomers are polychloroprene and block copolymers of styrene and butadiene or isoprene, such block copolymers being sold under the trademark Kraton by Shell Oil Company. Block copolymers of styrene and diene monomers are described in detail in U.S. Pat. Nos. 4,041,103 and 4,242,470 which are hereby incorporated by reference.

Other elastomeric polymers having a Tg below −25° C. and solubility in the methyl methacrylate monomer can be employed since, other than the low Tg and solubility characteristics, there are no other limitations on the identity of the elastomers except for the specific requirements of the particular adhesive being formulated, such as suitable molecular weight, viscosity characteristics and compatibility with the other ingredients of the adhesive.

Useful elastomers are those which are soluble in the monomers used in the adhesives of this invention. These elastomers can form solutions of from about 10 to about 35 weight percent elastomer in methyl methacrylate. As used herein the term "solution" is intended to cover not only true solutions but colloidal dispersion which exhibit normal or substantially newtonian rheology characteristics.

The core-shell graft copolymers useful in this invention have a "rubbery" core, a "hard" shell, and swell in the monomer compositions but do not dissolve therein. The "core" or backbone polymer of the graft copolymers has a glass transition temperature substantially below ambient temperatures. The "shell" polymer which is grafted onto the backbone polymer has a glass transition temperature substantially above ambient temperatures. Ambient temperature is defined as the temperature range in which the adhesive is used.

Examples of useful core-shell graft copolymers are those where "hard" monomers, such as styrene, acrylonitrile or methyl methacrylate, are grafted onto a rubbery core made from polymers of "soft" or "elastomeric" monomers, such as butadiene or ethyl acrylate.

U.S. Pat. No. 3,985,703, which is hereby incorporated by reference, describes useful core-shell polymers, the cores of which are made preferably from butyl acrylate but can be based on ethyl, isobutyl, 2-ethylhexyl, or other alkyl acrylates or mixtures thereof. The core polymer, optionally, can contain up to 20 percent of other copolymerizable monomers, such as styrene, vinyl acetate, methyl methacrylate, butadiene, isoprene and the like. The core polymer optionally, can contain up to 5 percent of a crosslinking monomer having two or more nonconjugated double bonds of approximately equal reactivity, such as ethylene glycol diacrylate, butylene glycol dimethacrylate and the like. It also optionally can contain up to 5 percent of a graft-linking monomer having two or more nonconjugated double bonds of unequal reactivity, such as diallyl maleate and allyl methacrylate.

The shell stage is preferably polymerized from methyl methacrylate and optionally other lower alkyl methacrylates, such as ethyl, butyl, or mixtures thereof. Up to about 40 percent by weight of the shell monomers can be styrene, vinyl acetate, vinyl chloride, and the like.

Additionally useful core-shell graft copolymers are described in U.S. Pat. No. 3,984,497, No. 4,096,202, and No. 4,034,013, which are hereby incorporated by reference.

Still other useful core shell polymers are the "MBS" polymers such as those described in U.S. Pat. No. 4,304,709 which is hereby incorporated by reference. The MBS polymers are made by polymerizing methyl methacrylate in the presence of polybutadiene or a polybutadiene copolymer rubber.

Other patents which describe various useful core-shell graft copolymers are U.S. Pat. No. 3,944,631, No. 4,306,040 and No. 4,495,324, each of which is hereby incorporated by reference.

The core-shell graft polymers used in this invention swell in size in the adhesive formulation but do not dissolve. The adhesives, so formulated, exhibit improved spreading and flow properties which are highly desirable in many adhesive applications. For example, when an adhesive is applied to an article by means of a syringe-type application, many adhesives "string-out" between the point where the applicator was applied and the next position of the applicator. With the present invention, a small drop of adhesive can be applied to the article to be bonded with no adhesive string forming.

Additional components of the composition of this invention are polymerization catalysts with or without other components which enhance the reactivity of the catalysts. The catalysts are free radical generators which trigger the polymerization of acrylate and methacrylate compounds. Such catalysts are peroxides, hydroperoxides, peresters, peracids, radiant energy, e.g., ultraviolet light, and heat. Examples of these catalysts are benzoyl peroxide, cumene hydroperoxide, tertiary butyl hydroperoxide, dicumyl peroxide, tertiary butyl peroxide acetate, tertiary butyl perbenzoate, ditertiary butyl azodiisobutyronitrile and the like. These free radical producing catalysts are used in amounts of about 0.01 to about 10 weight percent based on the weight of the adhesive composition. Preferably, the catalysts will be used in the amount of about 0.05 to about 3 weight percent.

Other components which enhance the reactivity of the catalysts are initiators or activators and promoters. Initiators and activators, which terms are used interchangeably, include tertiary amines and aldehyde-amine reaction products. Useful tertiary amines include N,N-dimethylaniline, N,N-dimethyltoluidine, N,N-diethylaniline, N,N-diethyltoluidine and the like. Aldehyde-amine reaction products include such compositions as butyraldehyde-aniline and butyraldehyde-butylamine compositions.

A promoter is an organic salt of a transition metal, such as cobalt, nickel, manganese or iron naphthenate, copper octoate, copper acetylacetonate, iron hexoate, or iron propionate.

The initiators or activators, if used, are added in the amount of up to about 15 weight percent based on the weight of the adhesive. Preferred amounts are 0.01 to about 5 percent. Promoters are used in amounts up to about 0.5 weight percent, preferably about 1 part per million to about 0.5 weight percent.

The compositions of this invention are usually prepared in two parts wherein 1 part contains the free radical catalysts and the other part contains the initiator or activator and the promoter if it is used. Just prior to use, the two parts are mixed together and the mixture is applied to at least one of the surfaces to be bonded. Alternatively, the part containing the catalyst can be applied to one surface and the part containing the activator can be applied to the other surface. When pressed together, the two parts mix together and polymerization with resultant adhesive bonding takes place.

The adhesive compositions of this invention will contain about 55 to about 75 weight percent methacrylate ester monomer, 0 to about 15 weight percent acid monomer, about 5 to about 20 weight percent elastomer and about 10 to about 30 weight percent core-shell graft copolymer, said weight percents being based on the total weight of the components. Preferably, the compositions contains about 60 to about 70 weight percent methacrylate ester monomer, about 2 to about 10 weight percent acid monomer, about 8 to about 15 weight percent elastomer and about 15 to about 20 weight percent core-shell graft copolymer.

The adhesive compositions of this invention have high adhesive bond impact strength (>15 ft-lb/sq.in) and high bulk tensile elongation (>10 percent) when measured at −10° F. (−23° C.) or below. The bulk tensile elongation of these compositions is largely reversible even at low test temperatures. This reversible high elongation contributes to the superior performance of these adhesives in structures which undergo impacts at low temperatures.

The compositions of this invention are particularly useful for bonding thermoplastic automobile bumpers which must pass simulated crash impact tests at −10° to −20° F. (−23° to −29° C.) In these tests, which measure energy management capability, bumpers are mounted horizontally and are impacted at various positions and angles with a pendulum or hydraulic ram at a rate that simulates a 2.5 or a 5 mile per hour crash. In this test, the bumper and the adhesive bondline experience both high impact forces and a deflection of as much as 3 or 4 inches at the center. After the test, the bumper springs back to its original shape. The high impact strength and high elongation, especially reversible elongation at low temperatures, of the compositions of this invention are clearly advantageous in this bumper application.

The combination of relatively high modulus up to temperatures of 180° F. (82° C.) and high impact strength and elongation at temperatures of −10° F. (−23° C.) or below is very advantageous for bumpers and other structural applications which require high stiffness and structural integrity together with resistance to impact and other high stresses.

In the following examples, the elastomers were dissolved in the monomers by mixing until a uniform solution was obtained and no visible rubber particles were present. The other components, e.g., the core-shell polymers were then added to the elastomer solution and were stirred until a coarse paste was formed. Further mixing with a high shear dispersion apparatus was continued until a smooth paste was obtained.

Adhesive strength tests were performed by mixing the formulations with a peroxide catalyst paste, or by combining two adhesive polymer-in-monomer solutions, one of which contained a peroxide, the other a catalyst activator.

The adhesives were tested as follows:

Lap Shear Strength (ASTM D-1002)

The adhesive shear strength of bonds formed between substrates, e.g., a polycarbonate/polyester thermoplastic resin (Xenoy, obtained from General Electric Company), was measured by applying sufficient adhesive to one end of a 25 mm×76 mm×6.3 mm coupon of the substrate to completely fill a 25 mm×12.5 mm×0.25 mm bond gap. A 0.25 mm wire shim or washer was used to control bond thickness. A second coupon was placed over the coupon coated with adhesive to provide the proper lap shear configuration in a mold designed to properly align the specimen.

After a cure time of 24 to 48 hours at room temperature, the bonds were tested at a separation rate of 1.27 mm per minute.

Impact Strength (ASTM D-950)

The impact strength of the adhesives was tested using the procedure of ASTM D-950 except that steel bars or rods having diameters of 12.7 mm and lengths of 76.2 mm and 9.5 mm, respectively, were used instead of the test specimens having dimensions specified in the ASTM testing method. Surfaces to be bonded together were first solvent cleaned and then grit blasted. After being bonded, the specimens were conditioned for two days at room temperature prior to testing.

Bulk Adhesive Stress—Strain (ASTM B-638)

Sufficient adhesive components were mixed to form a sheet of cured adhesive approximately 2.5 mm in thickness from which tensile test "dumbbells" were cut using a metal die as specified in the ASTM testing method. Unless otherwise specified, the stress-strain tests were performed at the indicated temperatures using a separation rate of 5 mm per minute.

Cold Impact Test on Plastic Substrates

This test was devised to simulate the impact and deflection forces that bonded structural assemblies, such as bumpers, experience under test conditions. This test was useful in evaluating the effect of "squeeze-out" at bond edges on the impact performance of the overall bonded assemblies. If the cured adhesive is not sufficiently elastic to relax under impact and elongation conditions, a crack can initiate in the adhesive bead and propagate through the bonded assembly, leading to failures.

In conducting the tests, a 15.2 cm long 5 gram bead of mixed adhesive was applied lengthwise on the centerline of a 15.2 cm×2.5 cm plastic coupon. A 2.5 cm length of 1.3 mm diameter stainless steel wire was placed approximately 6 mm from each end parallel to the plastic and perpendicular to the bead of adhesive. A 15.2 cm×1.3 cm plastic strip was pressed down onto the adhesive until it made contact with the wire. The bonded assembly was allowed to cure at room temperature for at least 24 hours.

Before testing, the assembly was placed in a −10° F. (−23° C.) freezer for at least 15 hours. The cold sample was tested by placing it in a modified National Forge Model TM 52004 Izod-Charpy impact tester fitted with a 10 ft/lb hammer. A fixture was used to hold the sample at each end with the 2.5 cm plastic strip facing the impact hammer and the hammer was allowed to impact the plastic. The area of the hammer which contacts the plastic is approximately 1 cm$^2$. At the lowest point in the swing where the assembly is impacted, the hammer is travelling at 11 feet per second. If, after the hammer impacts the cold plastic, the hammer rebounds and the test specimen remains intact, the result is recorded as a pass. If the plastic breaks at the point of impact, the result is recorded as a failure. Occasionally, the hammer impacts the plastic and rebounds, but the end of the plastic in the fixture cracks. This is recorded as an "end crack". It is considered a qualified pass, since the action of the fixturing assembly against the plastic imposes extraordinary stresses on the bonded assembly at these fulcrum points.

The components used in the examples are identified as follows:

| | |
|---|---|
| MMA | Methyl methacrylate monomer containing 22–28 ppm of hydroquinone inhibitor |
| MAA | Methacrylic acid containing 250 ppm of hydroquinone inhibitor |
| BMA | Butyl methacrylate |
| 2-EHMA | 2-Ethylhexyl methacrylate |
| Neoprene | Polychloroprene homopolymer having a Brookfield solution viscosity (5 weight percent in toluene) of about 20 to 35 mPa as measured on Model LVT visometer with UL adaptor |
| Nitrile Rubber | Carboxy modified butadiene-acrylonitrile elastomer with medium acrylonitrile content, specific gravity of 0.98 and Mooney viscosity ML-4, 212° F. of 30–45 |
| Hypalon 30 | Chlorosulfonated polyethylene containing 43 percent chlorine and 1.1 percent sulfur - duPont |
| Paraloid KM 753 | Core-shell polymer of methacrylate-butadiene - styrene with high butadiene content - Rohm & Haas |
| Paraloid KM 330 | All acrylic core-shell polymer - Rohm & Haas |
| Geloy 1020 | Core-shell polymer of acrylate rubber core and styrene-acrylonitrile shell |
| Hydrin 10 × 1 | Liquid epichlorohydrin homopolymer with a Brookfield viscosity (27° C.) of 2.5 × $10^5$ cps, a Tg of −25° C. and a number average molecular weight of 4,000. |
| DMT | N,N-dimethyl-p-tolidine |
| ZMTI | Zinc 2-mercaptotoluimidazole |
| VAMAC | ethylene-methyl acrylate copolymer gum-duPont |
| KRATON D 1320x | styrene-isoprene branched copolymer- Shell Oil Co. |
| TYRIN | Chlorinated polyethylene containing 42% chlorine, Dow Chemical Co. |
| DPESC | Diphenyl ether disulfonyl chloride |
| BHT | 2,6-Di-tert butyl p-cresol |
| CHP | Cumene hydroperoxide, 80 weight percent in cumene |
| BPO Paste | A paste of 55 percent benzoyl peroxide in benzyl butyl phthalate plasticizer |
| VANAX 808 | Butyraldehyde-aniline condensation product- R. Vanderbilt Co. |

The Peroxide Paste used in the examples was prepared as follows: Hydrin 10x1, 25 parts by weight, and trioctyl trimellitate plasticizer, 25 parts by weight, were placed in a plastic container and were heated to 110° F. (43° C.) KM 753, 10 parts was gradually added as the mixture was sheared with a laboratory Hochmeyer high shear mixture. After all the KM 753 had been added, shearing was continued for 5 minutes. The mixture was then placed in a 110° F. (43° C.) oven for one hour and was again sheared until a smooth paste was obtained. After cooling, the BPO paste, 40 parts, was added and the mixture was again sheared until a uniform smooth paste was obtained.

The following tables list components used to formulate adhesive compositions and show test results of cured adhesives. In preparing the adhesives, the Neoprene, nitrile rubber and Hypalon elastomer were dissolved in MMA to give solutions of 20, 25 and 40 weight percent, respectively. All other ingredients were combined by direct addition and were mixed as described hereinbefore.

The examples which have A and B parts are two part adhesives which are combined in a 1:1 weight ratio just prior to use. In the other examples (the 1 part adhesives), the Peroxide Paste was added prior to use, the mix ratio being 1:10 paste to adhesive.

Table I illustrates greatly improved cold elongation of the compositions of this invention, Ex 1 and 2, compared to a prior art example, Ex 3.

TABLE I

| | Example | | | |
|---|---|---|---|---|
| | 1 | 2 | 3 | |
| | | | A | B |
| Composition parts by wt | | | | |
| MMA | 62.85 | 60.25 | 54.40 | 74.65 |
| MAA | 5.0 | 5.0 | 9.7 | |
| Neoprene | 11.4 | | | |
| Nitrile rubber | | 14.0 | | |
| Hypalon 30 | | | 23.3 | |
| Paraloid KM 753 | 20.0 | 20.0 | 12.05 | |
| Paraloid KM 330 | | | | 8.2 |
| Geloy 1020 | | | | 9.6 |
| DMT | 0.75 | 0.75 | | |
| CHP | | | 0.3 | |
| BHT | | | 0.25 | |
| Vanax 808 | | | | 7.55 |
| Peroxide Paste | 10 | 10 | | |
| Stress/Strain at −11 ± 1° F. (−24 ± .5° C.) Tensile strength at break, psi | 5300 | 4800 | | 6000 |
| Elongation at break | | | | |
| % Average | 23 | 30 | | 9 |
| % Maximum | 26 | 44 | | 12 |
| Tg, °C. of elastomer | −39 | −20 & −30 | 10° C. | |

Table II illustrates the improvement in impact resistance at low temperatures of plastic assemblies bonded with the compositions of this invention, Ex 4 and 5, compared with a prior art composition, Ex 6. The steel impact test results show that Ex 4, 5 and 6 have similar impact strengths when measured by conventional methods.

TABLE II

| | Example | | | | |
|---|---|---|---|---|---|
| | 4 | 5 | | 6 | |
| | | A | B | A | B |
| Composition parts by wt | | | | | |
| MMA | 62.5 | 61.05 | 72.05 | 54.40 | 74.65 |
| MAA | 5.0 | 9.6 | | 9.7 | |
| Neoprene | 11.35 | 11.05 | 11.25 | | |
| Hypalon 30 | | | | 23.3 | |
| Paraloid KM 753 | 19.9 | 14.45 | 14.75 | 12.05 | |
| Paraloid KM 330 | | | | | 8.2 |
| Geloy 1020 | | | | | 9.6 |
| DMT | 0.75 | | 1.95 | | |
| CHP | | | | .3 | |
| BHT | | | | .25 | |
| ZMTI | 0.5 | | | | |
| Vanax 808 | | | | | 7.55 |
| Peroxide Paste | 10 | | | | |
| BPO Paste | | | 3.85 | | |
| Lap Shear Stgth, psi on Xenoy 1102 | | 1555 | 1595 | | 1460 |
| Cold Impact Test on Xenoy 1102 −12 ± 2° F. (−24.5 ± 1° C.) | Pass Fail Crack | 6 0 0 | 4 1 1 | | 1 5 0 |
| Steel Impact Stgth. | | 19.5 | 23.1 | | 22.0 |

Table III lists additional examples of adhesive compositions which provide adhesives with high elongation and resistance to low temperature impact failures when used to bond plastic. Examples 7 and 8 are made using elastomers having Tg's of less than −25° C., Example 9 uses an elastomer having a Tg higher than −25° C.

TABLE III

| Composition parts by weight | Example 7 A | Example 7 B | Example 8 A | Example 8 B | Example 9 A | Example 9 B |
|---|---|---|---|---|---|---|
| MMA | 35.5 | 73.5 | 35.5 | 73.5 | 35.5 | 73.5 |
| BMA | 14 | | 14 | | 14 | |
| 2-EHMA | 14 | | 14 | | 14 | |
| MAA | 10 | | 10 | | 10 | |
| VAMAC G | 11.5 | 11.5 | | | | |
| KRATON | | | 11.5 | 11.5 | | |
| TYRIN | | | | | 11.5 | 11.5 |
| Paraloid KM 753 | 15 | 15 | 15 | 15 | 15 | 15 |
| DMT | | 2 | | 2 | | 2 |
| BPO PASTE | 4 | | 4 | | 4 | |
| Elongation % at −11 ± 1° F. (−24 ± .5° C.) | | 17 | | 20 | | 5 |
| Steel impact Test ft-lb/in² at −20° F. (−29° C.) | | 24.4 | | 21.0 | | 8.9 |
| Cold impact test on Xenoy 1102, −12 ± 2° F. (−24 ± .5° C.) % passed | | 83 | | 100 | | 17 |
| Tg, °C. of Elastomer | −27.8 | | −56 | | +10 | |

The examples listed in Table IV show additional adhesive tested at low temperatures. The Example 10 adhesive contains a core-shell polymer but no low Tg elastomer. Example 11 has a core-shell polymer and an elastomer having a Tg above −25° C. Example 12 has a low Tg elastomer but no core-shell polymer. Example 13 contains a low Tg elastomer and no core-shell polymer. This adhesive exhibits decreased bonding strength on Xenoy plastic as shown in Table V. Example 14 contains both a low Tg elastomer and a core-shell polymer.

TABLE IV

| Composition part by weight | 10 | 11 | 12 | 13 | 14 A | 14 B |
|---|---|---|---|---|---|---|
| MMA | 62.85 | 62.85 | 69.27 | 62.85 | 62.60 | 66.74 |
| MAA | 5.0 | 5.0 | 5.0 | 5.0 | 9.68 | |
| Neoprene | | | 24.98 | | | |
| Nitrile rubber | | | | 31.4 | | |
| Hypalon 30 | | 11.4 | | | 11.15 | 11.15 |
| Paraloid KM 753 | 31.4 | 20.0 | | | 14.56 | 14.56 |
| DMT | 0.75 | 0.75 | 0.75 | 0.75 | | |
| CHP | | | | | 0.3 | |
| BHT | | | | | 0.25 | |
| Vanax 808 | | | | | | 7.55 |
| DPESC | | | | | 1.46 | |
| Peroxide Paste | 10 | 10 | 10 | 10 | | |
| Stress/Strain at −11 ± 1 F. (−24 ± .5 C. Tensile Stgth at break, psi | 6031 | 6980 | 3029 | 5025 | | 4975 |
| Elongation at break % AVG | <5% | <5% | 6% | 52% | | 11 |
| MAX | <5% | <8% | 6% | 70% | | 16% |
| Tg C. of elastomer | | +10 | −34.3 | −20 & −30 | | −34.3 |

The examples listed in Table V illustrate the decrease in adhesion to Xenoy plastic with increasing levels of nitrile rubber. Example 15 which contains the highest amount of nitrile rubber and no core shell polymer has the lowest Lap Shear Strength on Xenoy plastic. Examples 16 and 17, which contain elastomer and core-shell polymer within the limits of the invention, have good tensile strength elongation at break and adhesion to Xenoy plastic. Example 18 which contains less elastomer than claimed in the invention has good tensile strength and adhesion but poor elongation at break.

TABLE V

| Composition parts by weight | Example 15 | Example 16 | Example 17 | Example 18 |
|---|---|---|---|---|
| MMA | 70.9 | 60.3 | 58 | 63.4 |
| MAA | 5 | 5 | 5 | 5 |
| Nitrile rubber | 23.6 | 14.1 | 6.5 | 1.3 |
| Paraloid KM 753 | | 20.1 | 30 | 29.8 |
| DMT | .5 | .5 | .5 | .5 |
| Stress/Strain at −11 ± 1° F. (−23 ± .5° C.) Tensile Strength at break, psi | | 4590 | 5040 | 6400 |
| Elongation at break % AVG | | 18 | 15 | 4 |
| % MAX | | 25 | 15 | 5 |
| Lap Shear Strength, psi | 965 | 1480 | 1615 | 1663 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An adhesive composition comprising:
   a) a methacrylate ester monomer wherein the alcohol portion of the ester contains one to about 8 carbon atoms;
   b) an elastomeric polymer selected from the group consisting of nitrile rubber; polychloroprene; copolymers of butadiene or isoprene with styrene; copolymers of butadiene or isoprene with acrylate esters; copolymers of butadiene or isoprene with methacrylate esters; copolymers of ethylene and acrylate esters; homopolymers of epichlorohydrin; and copolymers of epichlorohydrin and ethylene oxide, wherein said elastomeric polymer is soluble in the ester monomer wherein soluble is defined as capable of forming solutions of from about 10 to about 35 weight percent elastomer in methyl methacrylate and wherein said elastomeric polymer has a Tg below about −25° C.;
   c) a core-shell graft copolymer which swells in the monomer but does not dissolve therein; and
   d) a free radical producing catalyst.

2. The adhesive composition of claim 1 wherein the copolymer of butadiene or isoprene and styrene is a block copolymer.

3. The adhesive composition of claim 1 which contains a free radical polymerizable ethylenically unsaturated mono or polycarboxylic acid.

4. The adhesive composition of claim 3 wherein the acid is methacrylic acid.

5. The adhesive composition of claim 1 wherein the methacrylate ester monomer is at least 50 weight percent methyl methacrylate.

6. The adhesive composition of claim 1 wherein the elastomeric polymer is soluble in the monomer in the amount of from about 10 to about 35 weight percent based on the weight of the solution.

7. The adhesive composition of claim 1 wherein the Tg of the core of the core-shell graft copolymer is substantially below ambient temperatures and the Tg of the shell is substantially above ambient temperatures.

* * * * *